United States Patent
Seo et al.

(10) Patent No.: US 9,641,995 B2
(45) Date of Patent: May 2, 2017

(54) USER EQUIPMENT DETECTION METHOD FOR DIRECT COMMUNICATION BETWEEN USER EQUIPMENT AND USER EQUIPMENT IN WIRELESS COMMUNICATION SYSTEM, AND APPARATUS THEREFOR

(71) Applicant: LG ELECTRONICS INC., Seoul (KR)

(72) Inventors: Hanbyul Seo, Anyang-si (KR); Jonghyun Park, Anyang-si (KR); Seungmin Lee, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 28 days.

(21) Appl. No.: 14/407,010

(22) PCT Filed: May 13, 2013

(86) PCT No.: PCT/KR2013/004212
§ 371 (c)(1),
(2) Date: Dec. 10, 2014

(87) PCT Pub. No.: WO2013/187605
PCT Pub. Date: Dec. 19, 2013

(65) Prior Publication Data
US 2015/0181406 A1 Jun. 25, 2015

Related U.S. Application Data

(60) Provisional application No. 61/659,991, filed on Jun. 15, 2012, provisional application No. 61/767,756, filed on Feb. 21, 2013.

(51) Int. Cl.
*H04W 4/00* (2009.01)
*H04W 8/00* (2009.01)
(Continued)

(52) U.S. Cl.
CPC ......... *H04W 8/005* (2013.01); *H04W 72/042* (2013.01); *H04W 76/023* (2013.01);
(Continued)

(58) Field of Classification Search
CPC . H04W 8/005; H04W 72/042; H04W 76/023; H04W 48/12; H04W 88/02; H04W 92/18
See application file for complete search history.

(56) References Cited

U.S. PATENT DOCUMENTS 8,849,290 B2 * 9/2014 Gao .................... H04W 76/023
370/329
2006/0258383 A1 * 11/2006 Jiang ................. H04W 56/0045
455/502
(Continued)

FOREIGN PATENT DOCUMENTS

WO WO 2011/133004 A2 10/2011
WO WO 2011/136524 A2 11/2011
WO WO 2012/052598 A1 4/2012

*Primary Examiner* — Abdelnabi O Musa
(74) *Attorney, Agent, or Firm* — Birch, Stewart, Kolasch & Birch, LLP

(57) ABSTRACT

Disclosed in the present application is a method for enabling user equipment to transmit and receive a discovery signal for direct communication between user equipment in a wireless communication system. Specifically, the method comprises the steps of: receiving, from a base station, information related to a plurality of configurations for the discovery signal through an upper layer; receiving, from the base station, downlink control information on a first sub-frame, comprising a field indicating one configuration among the plurality of configurations through a physical layer; and transmitting and receiving the discovery signal on the first frame and then on a second frame by using the indicated configuration.

6 Claims, 12 Drawing Sheets

(51) Int. Cl.
*H04W 76/02* (2009.01)
*H04W 72/04* (2009.01)
H04W 48/12 (2009.01)
H04W 88/02 (2009.01)
H04W 92/18 (2009.01)

(52) U.S. Cl.
CPC ............ *H04W 48/12* (2013.01); *H04W 88/02* (2013.01); *H04W 92/18* (2013.01)

(56) References Cited

U.S. PATENT DOCUMENTS

| | | | |
|---|---|---|---|
| 2009/0017807 A1* | 1/2009 | Kwon | H04W 76/021 455/416 |
| 2009/0017843 A1* | 1/2009 | Laroia | H04W 76/023 455/458 |
| 2009/0213760 A1* | 8/2009 | Shin | H04W 74/002 370/254 |
| 2011/0228666 A1* | 9/2011 | Barbieri | H04W 76/023 370/216 |
| 2012/0008618 A1* | 1/2012 | Wang | H04W 56/002 370/350 |
| 2012/0182907 A1* | 7/2012 | Li | H04W 76/023 370/280 |
| 2012/0224546 A1* | 9/2012 | Chang | H04W 76/023 370/329 |
| 2013/0029675 A1 | 1/2013 | Kwon et al. | |
| 2013/0039262 A1 | 2/2013 | Lim et al. | |
| 2013/0195026 A1* | 8/2013 | Johnsson | H04W 72/0493 370/329 |
| 2013/0235820 A1* | 9/2013 | Wu | H04W 76/023 370/329 |

\* cited by examiner

FIG. 2
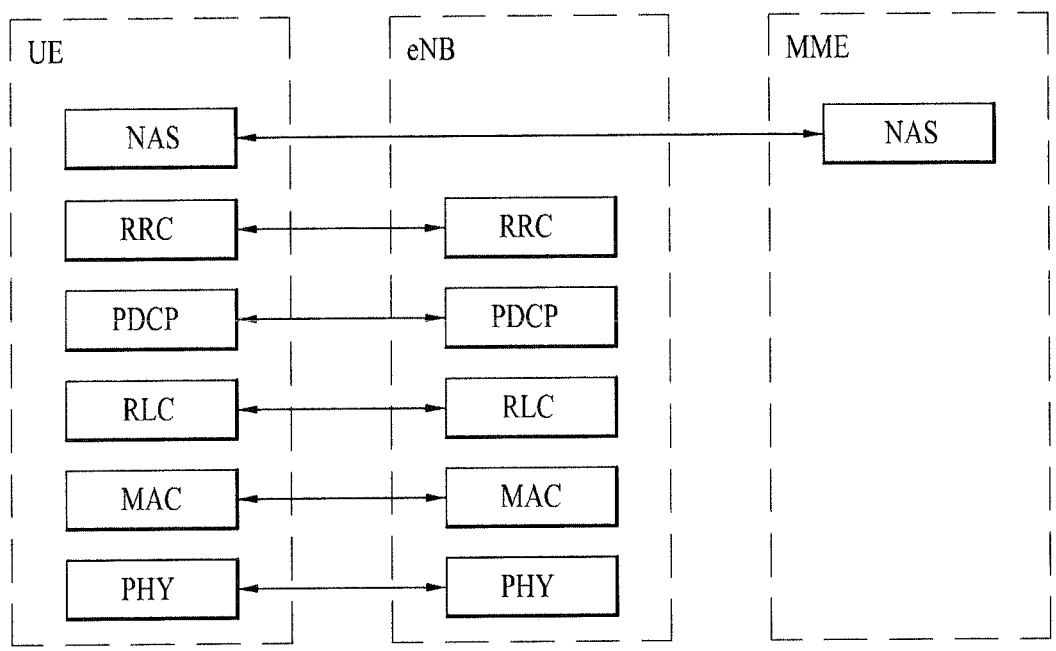
(a) CONTROL-PLANE PROTOCOL STACK
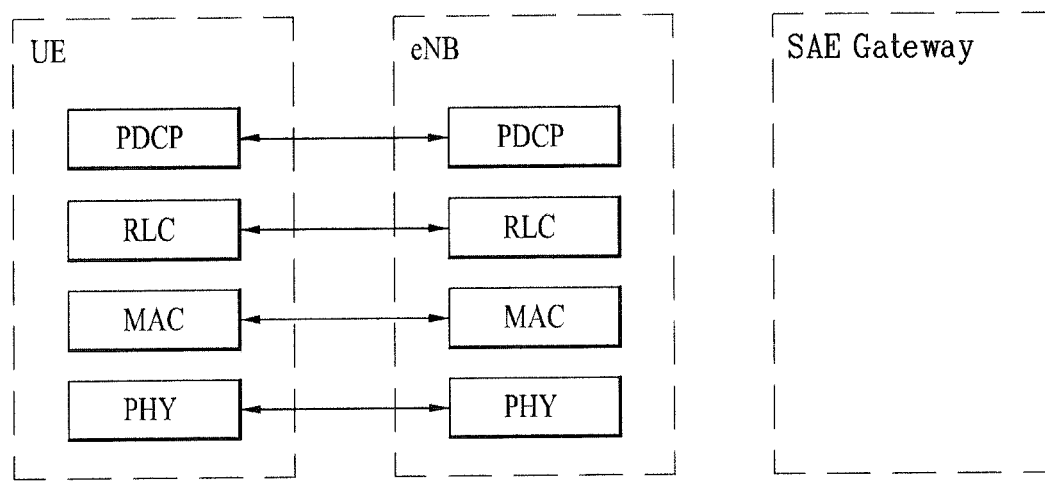
(b) USER-PLANE PROTOCOL STACK

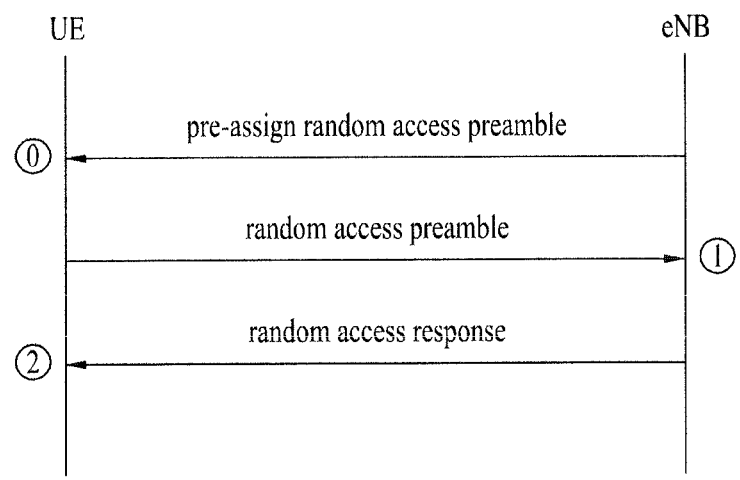
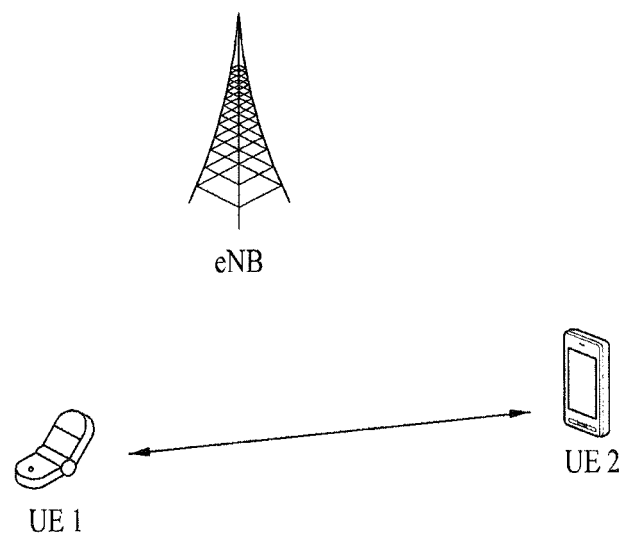

USER EQUIPMENT DETECTION METHOD FOR DIRECT COMMUNICATION BETWEEN USER EQUIPMENT AND USER EQUIPMENT IN WIRELESS COMMUNICATION SYSTEM, AND APPARATUS THEREFOR

CROSS REFERENCE TO RELATED APPLICATIONS

This application is the National Phase of PCT/KR2013/004212 filed on May 13, 2013, which claims priority under 35 U.S.C. 119(e) to U.S. Provisional Application No. 61/659,991 filed on Jun. 15, 2012 and 61/767,756 filed on Feb. 21, 2013, all of which are hereby expressly incorporated by reference into the present application.

TECHNICAL FIELD

The present invention relates to a wireless communication system and, more particularly, to a method and apparatus for detecting a user equipment (UE) for direct communication between UEs in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the problem lies in a method and apparatus for detecting a user equipment (UE) for direct communication between UEs in a wireless communication system.

Technical Solution

The object of the present invention can be achieved by providing a method for, at a user equipment (UE), transmitting and receiving a discovery signal for direct communication between UEs in a wireless communication system receiving information about a plurality of configurations for the discovery signal from a base station via a higher layer signal, receiving downlink control information including a field indicating one of the plurality of configurations from the base station on a first subframe via a physical layer and transmitting and receiving the discovery signal on a second subframe after the first subframe using the indicated configuration.

The downlink control information may further include information indicating one of transmission or reception of the discovery signal. The plurality of configurations may include information indicating one of transmission or reception of the discovery signal.

In this case, the method may further include, if reception of the discovery signal is indicated at the second subframe and an uplink control signal needs to be transmitted to the base station on the second subframe, transmitting the uplink control signal to the base station on a next subframe of the second subframe.

The method may further include determining whether a predetermined signal is received in a data region of a previous signal of the second subframe if reception of the discovery signal is indicated at the second subframe and receiving the discovery signal if the predetermined signal is not received in the data region.

The method may further include reporting a received strength of the discovery signal and information about the second subframe to the base station if reception of the discovery signal is indicated at the second subframe.

According to another aspect of the present invention, there is provided a user equipment (UE) apparatus for performing direct communication between UEs in a wireless communication system including a wireless communication module configured to transmit and receive a signal to and from a base station or a counterpart UE apparatus of direct communication between UEs and a processor configured to process the signal, wherein the processor controls the wireless communication module to receive information about a plurality of configurations for a discovery signal from the base station via a higher layer signal, receive downlink control information including a field indicating one of the plurality of configurations from the base station on a first subframe via a physical layer and transmit and receive the discovery signal on a second subframe after the first subframe using the indicated configuration.

Advantageous Effects

According to embodiments of the present invention, it is possible to efficiently detect a user equipment (UE) for direct communication between UEs in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

FIG. 2 is a diagram showing a control plane and a user plane of a radio interface protocol architecture between a User Equipment (UE) and an Evolved Universal Terrestrial Radio Access Network (E-UTRAN) based on a $3^{rd}$ Generation Partnership Project (3GPP) radio access network standard.

FIG. 7 is a diagram showing a contention-free based random access procedure among random access procedures of an LTE system.

FIG. 8 is a diagram illustrating the concept of direct communication between UEs.

BEST MODE

Figure 1:
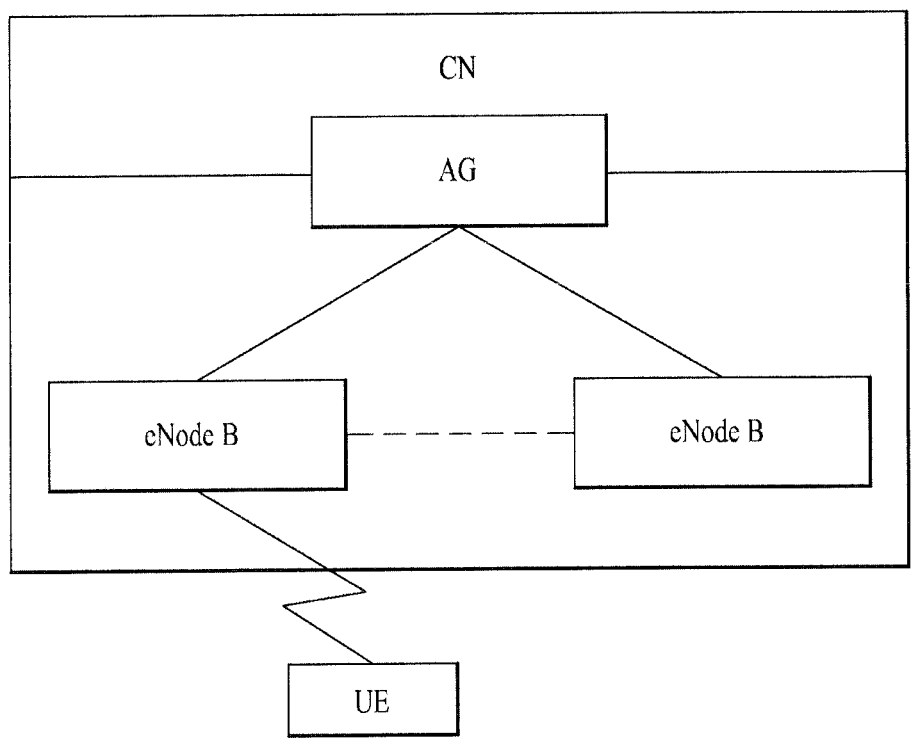
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
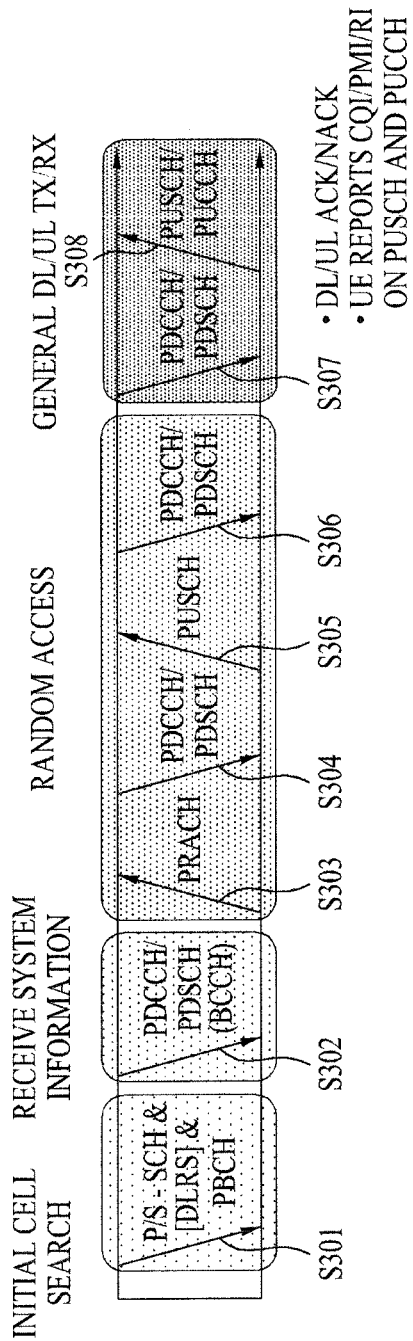
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
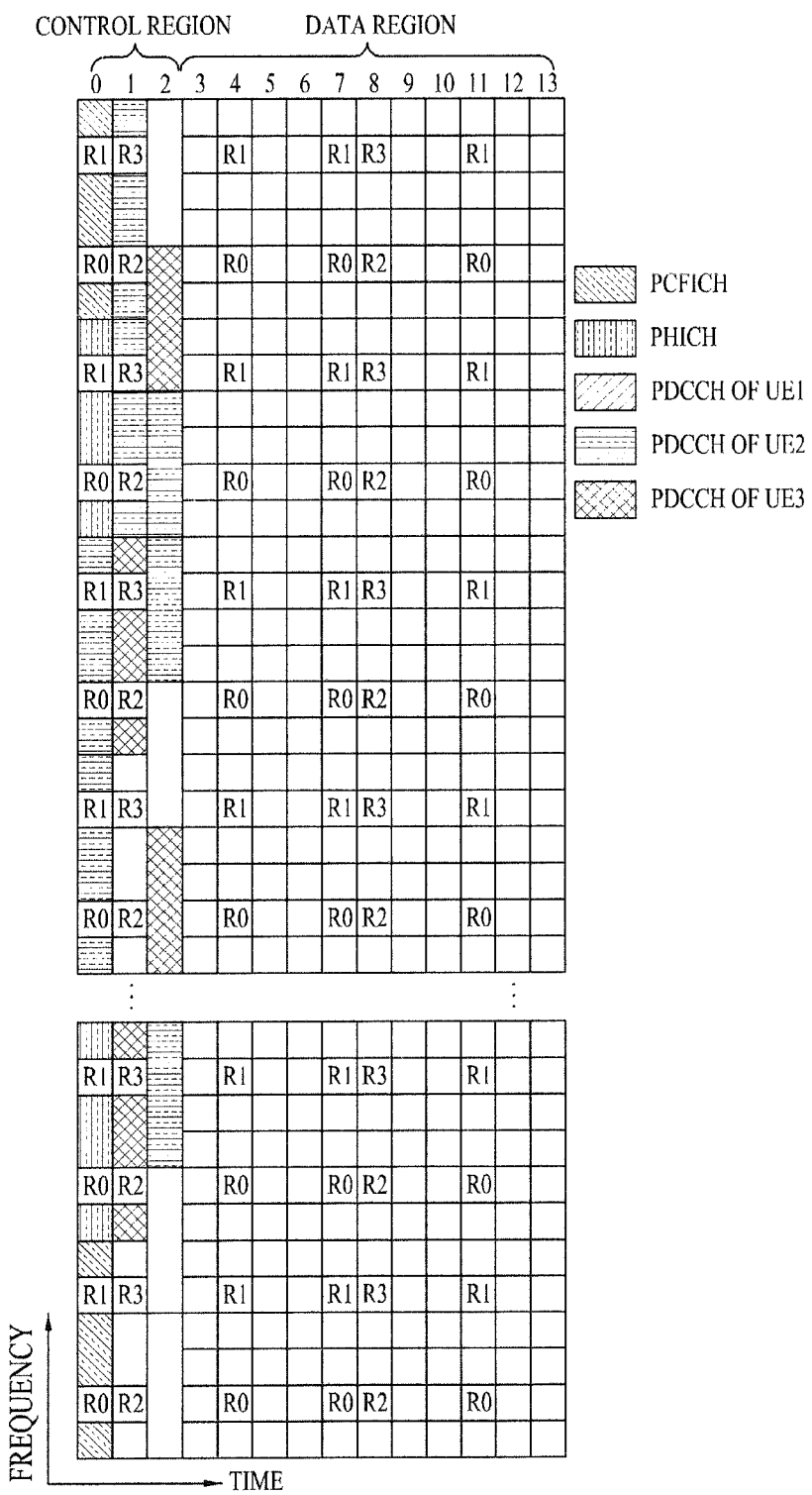
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
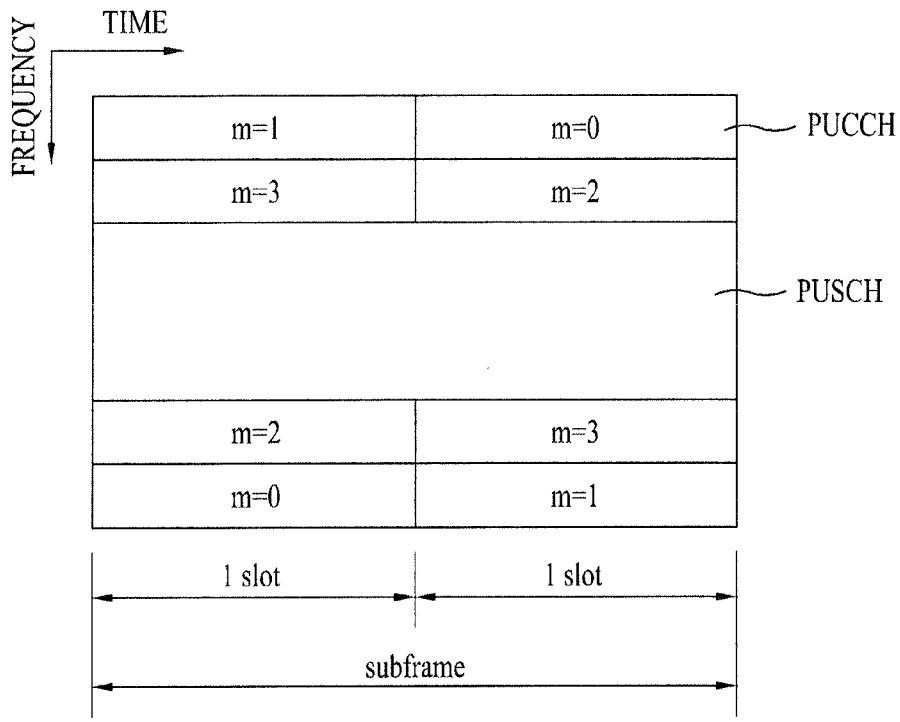
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

A basic resource unit of a DL control channel is an REG. The REG includes four contiguous REs except for REs carrying RSs. A PCFICH and a PHICH include 4 REGs and 3 REGs, respectively. A PDCCH is configured in units of a Control Channel Element (CCE), each CCE including 9 REGs.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Hereinafter, a random access procedure defined in an LTE system will be described. In the LTE system, the random access procedure is divided into a contention based random access procedure and a contention-free random access procedure, which will be described in greater detail with reference to the respective drawings.

Figure 6:
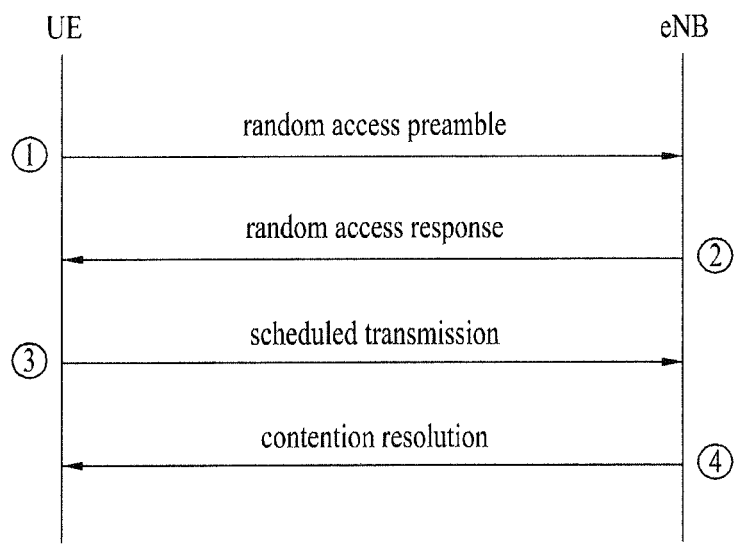
FIG. 6 is a diagram showing a contention based random access procedure among random access procedures of an LTE system.

FIG. 6 is a diagram showing a process performed between a user equipment (UE) and an eNB in a contention based random access procedure.

In the contention based random access procedure, the UE may randomly select a random access preamble from a group of random access preambles indicated via system information or a handover command, select Physical Random Access Channel (PRACH) resources for transmitting the random access preamble and transmit the selected random access preamble to the eNB (step 1).

After the UE has transmitted the random access preamble, the UE may attempt to receive a response to the random access preamble within a random access response reception window indicated via system information or a handover command (step 2).

More specifically, random access information may be transmitted in the form of a medium access control (MAC) protocol data unit (PDU) and the MAC PDU may be transmitted on a PDSCH. In addition, a PDCCH is transmitted such that the UE appropriately receives the information transmitted on the PDSCH. That is, the PDCCH includes information about a UE which will receive the PDSCH, frequency and time information of radio resources of the PDSCH, transmission format of the PDSCH, etc. When a physical downlink control channel is successfully received, the UE may appropriately receive a random access response transmitted on the PDSCH according to information about the PDCCH. The random access response may include a random access preamble identifier (ID), uplink grant, temporary C-RNTI, time alignment command (TAC), etc. In particular, the random access preamble identifier may be equal to the random access preamble selected by the UE in step 1.

When the UE receives a valid random access response, the UE may process information included in the random access response. That is, the UE stores the temporary C-RNTI. In addition, the UE uses uplink grant in order to transmit data stored in a buffer of the UE to the eNB or to transmit newly generated data to the eNB (step 3).

In the contention based random access procedure, since the eNB may not determine which UEs perform the random access procedure and UEs should be identified later for contention resolution, a UE identifier must be included in data included in uplink grant.

Here, two different methods for including the UE identifier may be provided. In a first method, when the UE has already received a valid cell identifier assigned within a cell before the random access procedure, the cell identifier of the UE is transmitted via uplink grant. In a second method, when the UE did not receive the valid cell identifier before the random access procedure, the unique identifier of the UE is transmitted. In general, the unique identifier of the UE is longer than the cell identifier. In step 3, if the UE has transmitted data via uplink grant, the UE starts a contention resolution timer.

After data has been transmitted along with the identifier via the uplink grant included in the random access response, the UE waits for an indication of the eNB for contention resolution. That is, the UE attempts to receive the PDCCH in order to receive a specific message (step 4).

Here, there are two methods for receiving the PDCCH. As described above, if the UE identifier transmitted via the uplink grant is a cell identifier, the UE attempts to receive the PDCCH using the cell identifier thereof. If the UE identifier transmitted via the uplink grant is a unique identifier of the UE, the UE attempts to receive the PDCCH using a temporary C-RNTI included in the random access response.

Thereafter, in the former case, when the PDCCH is received via the cell identifier before the contention resolution timer expires, the UE determines that the random access procedure has been successfully performed and finishes the random access procedure.

In the latter case, when the PDCCH is received via a temporary cell identifier before the contention resolution timer expires, the UE checks data transmitted by the PDSCH indicated by the PDCCH. If the unique identifier of the UE is included in data, the UE determines that the random access procedure has been successfully performed and finishes the random access procedure.

FIG. 7 is a diagram showing a process performed between a UE and an eNB in a contention-free based random access procedure. As compared to the contention based random access procedure, it is determined that the contention-free random access procedure has been successfully performed by receiving random access response information to transmission of a pre-assigned random access preamble. Thus, the random access procedure is finished.

In general, the contention-free random access procedure is performed in the following two cases, that is, a handover procedure and when the contention-free random access procedure is requested by a command of an eNB. The contention based random access procedure may be performed in these two cases. In a first case, in the contention-free random access procedure, it is important to receive a dedicated random access preamble from the eNB without possibility of contention. A handover command and a PDCCH command may be executed in order to assign a random access preamble. Thereafter, if a random access preamble dedicated to the UE is assigned by the eNB, the UE transmits the preamble to the eNB. Thereafter, the method for receiving the random access information is equal to that of the contention based random access procedure.

The contention-free random access procedure starts when the eNB instructs the UE to start the contention-free random access procedure. In this case, the eNB selects a specific preamble to be used during the random access procedure and directly informs the UE of the selected preamble. For example, when the eNB informs the UE that a random access preamble identifier number 4 (that is, RAPID=4) is used, the UE may use a unique preamble corresponding to RAPID=4 to perform the contention-free random access procedure.

FIG. 8 is a diagram illustrating the concept of direct communication between UEs.

Referring to FIG. 8, in device-to-device (D2D) communication in which a UE directly performs wireless communication with another UE, that is, in direct communication between UEs, an eNB may transmit a scheduling message indicating D2D transmission and reception. A UE participating in D2D communication receives the D2D scheduling message from the eNB and performs transmission and reception operation indicated by the D2D scheduling message.

In the present invention, as shown in FIG. 8, a method for detecting a UE, which is a communication counterpart, when a UE performs D2D communication with another UE using a direct radio channel is proposed.

As described with reference to FIG. 8, the UE should first check whether the counterpart UE is present in a direct communication region in order to perform direct communication. A process of determining whether the counterpart UE is close is referred to as device discovery or device detection. In such device discovery, one UE transmits a specific signal and another UE detects the specific signal. A signal transmitted and detected by the UEs for discovery is referred to as a discovery signal.

As the discovery signal, various signals defined for existing cellular communication, e.g., a demodulation (DM)-reference signal (RS) for physical random access channel (PRACH) preamble or PUSCH demodulation in a 3GPP LTE system, a sounding RS transmitted by a UE in order to acquire channel state information (CSI), etc. may be reused or a new signal optimized for the purpose of discovery may be used. Since operation for transmitting and receiving a discovery signal may cause interference with another link or another channel of a wireless network and restrict operation of a UE participating in transmission and reception, e.g., communication with an eNB, discovery operation may be performed under management of the eNB. For example, device detection may be performed by the eNB indicating transmission of a discovery signal with respect to a specific UE (hereinafter, referred to as UE #1) and indicating reception of the discovery signal with respect to another UE (hereinafter, referred to as UE #2) via an appropriate control signal. Operation for transmitting and receiving the discovery signal is divided into periodic operation and aperiodic operation.

First, a periodic discovery signal is used for device detection when UE #1 periodically transmits a discovery signal and UE #2 detects the discovery signal of UE #1 at a transmission time. The periodic discovery signal is suitable when UE #1 directly transmits a large amount of data to UE #2 or when UE #1 transmits a signal such as advertisements to a plurality of unspecific UEs #2.

In contrast, in the case of the aperiodic discovery signal, UE #1 transmits the discovery signal only at a specific time indicated by the eNB and, more particularly, at a specific time indicated via a physical layer control signal such as a PDCCH. Therefore, it is possible to detect the discovery signal only when the eNB dynamically indicates the signal transmission time. The aperiodic method is suitable when a small amount of data is intermittently exchanged between UEs or when the discovery process should be performed again because a channel is rapidly changed during direct communication between UEs.

The present invention proposes a device detection (device discovery) method based on aperiodic discovery signal transmission and reception operation.

Figure 9:
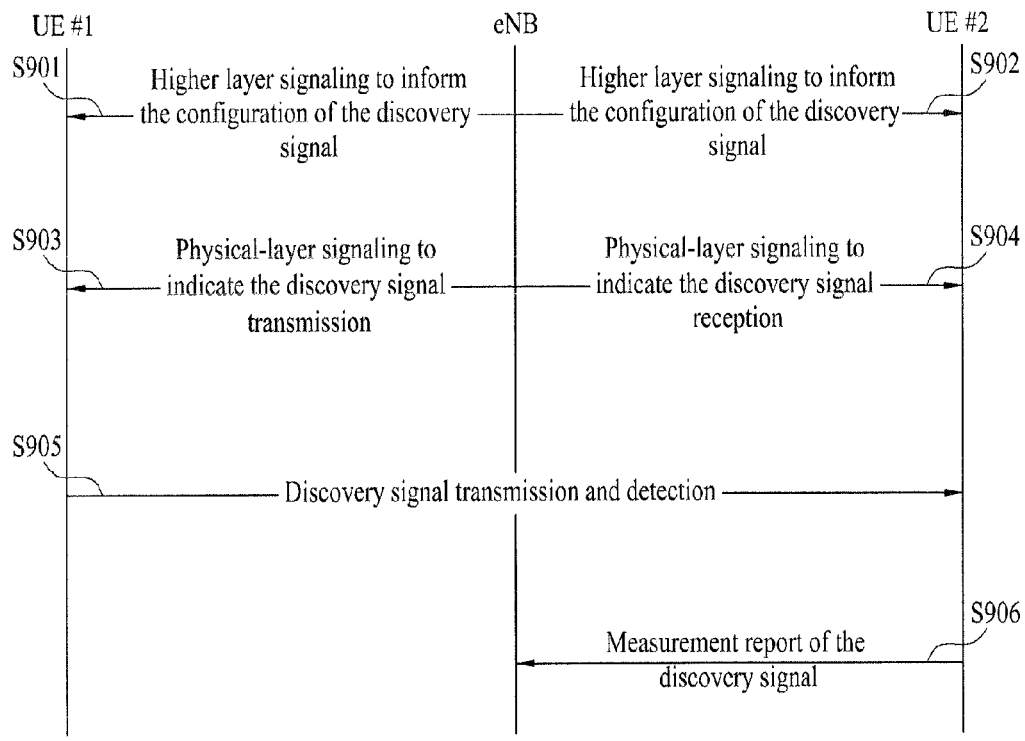
FIG. 9 is a flowchart illustrating aperiodic discovery signal transmission and reception operation according to an embodiment of the present invention.

FIG. 9 is a flowchart illustrating aperiodic discovery signal transmission and reception operation according to an embodiment of the present invention.

Referring to FIG. 9, first, an eNB may inform UE #1 and UE #2 of a configuration of an aperiodic discovery signal via a higher layer signal such as RRC (S901 and S902). For example, the eNB may inform the UEs of locations of time/frequency resources, on which an aperiodic discovery signal is transmitted, and a parameter for determining a signal waveform. Examples of the parameter for determining the signal waveform may include a base sequence type and a cyclic shift value if the discovery signal is determined by applying cyclic shift to a specific base sequence. In addition, the eNB may additionally inform the transmission UE of a transmit power related parameter of the discovery signal, e.g., a transmit power value of the discovery signal or a transmit power difference value between the discovery signal and another transmission signal of the same UE, such as a PUSCH.

In addition, the eNB indicates to UE #1 that a discovery signal is transmitted using a pre-signaled parameter via a physical layer signal such as a PDCCH when transmission of the discovery signal is necessary (S903). Similarly, the eNB may inform UE #2 that the discovery signal using the pre-signaled parameter is transmitted using the physical layer signal such as the PDCCH and indicate that signal detection is performed (S904).

According to the indication of S903, UE #1 may transmit the discovery signal using the pre-signaled parameter (S905) and UE #2, which has successfully performed signal detection, may report a result of measuring the strength of the received signal to the eNB (S906).

The indication via the physical layer signal in S903 and S904 may be valid only at one subframe or over a predetermined number of subframes. In addition, in order to ensure a signal processing time of a UE, a predetermined gap between the indication time of the physical layer signal and the activation time of the real discovery signal (that is, the transmission time of the real discovery signal) may be present. Further, in FIG. 9, although it is assumed that the transmission times of the higher layer signal and the physical layer signal to UE #1 are equal to the transmission times of the higher layer signal and the physical layer signal to UE #2, these transmission times may be different.

Additionally, the number of configurations of the discovery signals transmitted to the UEs via the higher layer signal in S901 and S902 may be two or more. That is, the eNB may establish several configurations with respect to UE #1 and inform UE #1 of which of the several configurations is used to transmit the discovery signal at a time when transmission of a real aperiodic discovery signal is indicated. A field for selecting one of the pre-signaled configurations may be added to a control signal indicating aperiodic discovery signal transmission.

Figure 10:
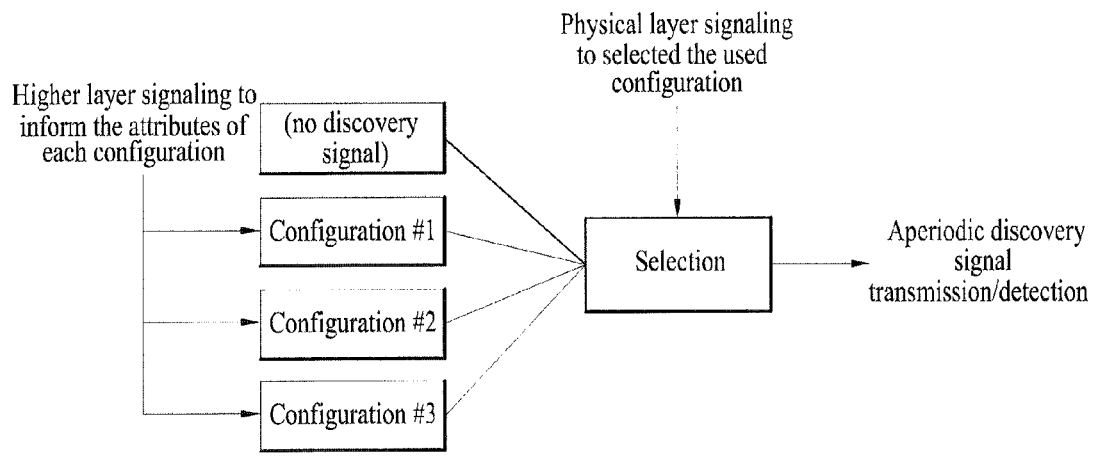
FIG. 10 is a diagram showing a process of dynamically selecting one of a plurality of configurations for a discovery signal according to an embodiment of the present invention.

FIG. 10 is a diagram showing a process of dynamically selecting one of a plurality of configurations for a discovery signal according to an embodiment of the present invention.

Referring to FIG. 10, three configurations for the discovery signal are established via a higher layer signal. In addition, one of the plurality of configurations for the discovery signal may be selected using a field having a size of 2 bits included in a physical layer signal such as a PDCCH. Hereinafter, for convenience of description, the field having the size of 2 bits is referred to as a configuration selection field.

That is, the configuration selection field may be set to one of 00, 01, 10 and 11. In particular, 00 indicates that no discovery signal is transmitted and 01, 10 and 11 respectively indicate signal transmission using configuration #1, signal transmission using configuration #2 and signal transmission using configuration #3.

Similarly, a plurality of configurations used to receive a discovery signal may be indicated and a configuration to be used for reception may be dynamically indicated at each time. The configuration selection field of the discovery signal may be added to DCI scheduling a general PDSCH or PUSCH and indicate transmission and reception of a discovery signal while scheduling a PDSCH or PUSCH.

Additionally, along with the configuration selection field of the discovery signal, an additional field indicating transmission or reception of the discovery signal may be separately defined. For example, a field having a size of 1 bit may be added to the configuration selection field having the size of 2 bits to indicate whether the UE transmits or receives the discovery signal of the selected configuration using the additional field. Hereinafter, for convenience of description, the field having the size of 1 bit is referred to as a transmission and reception selection field. According to the definition of the transmission and reception selection field, transmission and reception of the discovery signal may be dynamically changed between UE #1 and UE #2.

The transmission and reception selection field may be added to DCI even when only one configuration of the discovery signal is present. For example, if the discovery signal reuses the waveform of an existing SRS, a 1-bit indicator may be added to DCI triggering an aperiodic SRC may be added to indicate whether the UE, which has received the DCI, transmits or receives the aperiodic SRS.

Meanwhile, in addition to a method for additionally defining a transmission and reception selection field in DCI, information indicating whether the discovery signal of the configuration is transmitted or received via a higher layer signal indicating the configuration of the discovery signal may be included. That is, in the example of FIG. 10, although configuration #2 and configuration #3 are the same in terms of resources and parameters of the discovery signal, configuration #2 may indicate transmission of the discovery signal and configuration #3 may indicate reception of the discovery signal. Of course, one of configurations #2 and #3 may be differently established.

In this case, transmission and reception of the discovery signal may be dynamically controlled without additionally defining the transmission and reception selection field. That is, if the discovery signal reuses the waveform of the SRS, the UE may indicate that each configuration is for transmission or reception of the aperiodic SRS when the configuration of the aperiodic SRS is indicated via a higher layer signal. The UE transmits the discovery signal if an aperiodic SRC configuration for signal transmission is selected by DCI and receives the discovery signal if an aperiodic SRS configuration for signal reception is selected.

The eNB may inform a plurality of UEs of the same discovery signal configuration. In particular, since direct communication between UEs is performed between adjacent UEs only, the discovery signal is generally transmitted with low power. This means that the same resources and the same signal may be reused for direct communication between different UEs at a position appropriately separated from a position where direct communication between UEs is performed. Reuse of the signal configuration can reduce the kinds of discovery signal configurations to simplify device implementation.

In addition, if a plurality of UEs uses the same discovery signal, it may be unclear which UE transmits a discovery signal received by a specific UE. In order to prevent this problem, the UE, which has received an indication indicating reception of a specific discovery signal configuration, may measure the signal and report when measurement has been performed, e.g., in which radio frame measurement has been performed, to the eNB along with the measured value. Since the eNB knows the UE which has transmitted the discovery signal and when the discovery signal has been transmitted, it is possible to check the UE, the signal of which has been measured.

Figure 11:
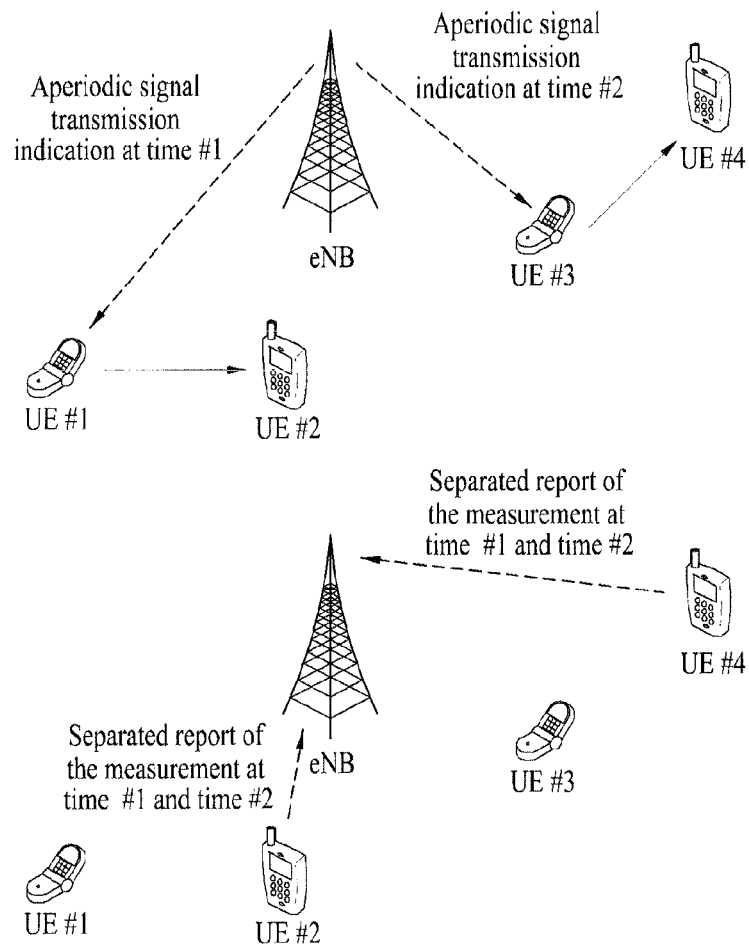
FIG. 11 is a diagram showing a situation in which direct communication among a plurality of UEs is performed according to an embodiment of the present invention.

FIG. 11 is a diagram showing a situation in which direct communication among a plurality of UEs is performed according to an embodiment of the present invention. In particular, FIG. 11 shows an example in which different UEs perform device detection at different times, for the same configuration of the discovery signal.

Referring to FIG. 11, the eNB first signals the same configuration of the discovery signal to UE #1 and UE #3, indicates transmission of UE #1 at time #1 and indicates transmission of UE #3 at time #2. UE #2 and UE #4 report received strengths of discovery signals to the eNB according to the given configuration, separate measurements of respective times and separately report a measurement of time #1 and a measurement of time #2. Separately reporting the measurements means that UE #2 measures the discovery signal of the same configuration at different times and separately reports the measurement at time #1 and the measurement at time #2 without averaging the measurements.

Additionally, the UE may have a choice in the report of the discovery signal. More specifically, only a measurement having highest power among the measurements of the same configuration of the discovery signal may be reported along with information about the time when the measurement is detected or only measurements having a predetermined level or more are reported along with the measurement time information, thereby reducing unnecessary measurement reporting.

UE #2, which has received the indication indicating reception of the aperiodic discovery signal, may not perform uplink transmission at an uplink subframe for detecting the discovery signal, due to self interference which may occur when transmission and reception are simultaneously performed in the same frequency band. Accordingly, although reception of the aperiodic discovery signal is indicated in DCI including DL assignment, if uplink ACK/NACK for a PDSCH scheduled in downlink assignment should be transmitted on a subframe for detecting the aperiodic discovery signal, uplink ACK/NACK transmission may be impossible.

In this case, the UE may transmit uplink ACK/NACK on another subframe, for example, a next subframe, along with uplink ACK/NACK which should have originally been transmitted on the next subframe, if necessary. At this time, a result of performing logical AND operation with respect to a plurality of ACK/NACK signals may be transmitted using an ACK/NACK bundling scheme or ACK/NACK resources are appropriately selected via PUCCH channel selection, thereby simultaneously transmitting the plurality of uplink ACK/NACK information.

Figure 12:
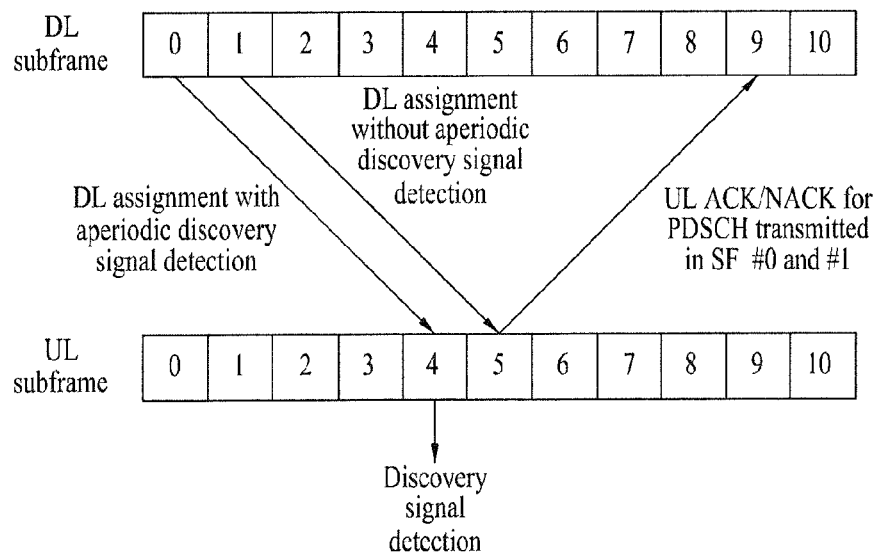
FIG. 12 is a diagram showing a method for solving a problem which may occur by reception of a discovery signal according to an embodiment of the present invention.

FIG. 12 is a diagram showing a method for solving a problem which may occur by reception of a discovery signal according to an embodiment of the present invention.

Referring to FIG. 12, first, the eNB indicates detection of the aperiodic discovery signal while transmitting a PDSCH on downlink subframe #0. Assume that uplink ACK/NACK for the PDSCH on subframe #n is transmitted on subframe #(n+4) and the aperiodic discovery signal indicated at subframe #n is activated at subframe #(n+4).

In this case, since the UE should detect the discovery signal at uplink subframe #4, uplink ACK/NACK for the PDSCH of downlink subframe #0 may not be transmitted. Accordingly, the UE also transmits ACK/NACK for the PDSCH received on downlink subframe #0 when transmitting, on uplink subframe #5, uplink ACK/NACK for the PDSCH received on downlink subframe #1. The eNB should receive uplink ACK/NACK transmitted on uplink subframe #5 and perform appropriate HARQ operation.

Reception of the aperiodic D2D discovery signal may be autonomously performed by the UE without a separate dynamic indicator from the eNB. For example, the eNB transmits higher layer signaling indicating the configuration of each discovery signal to the UE as shown in FIG. 10 but does not specify a discovery signal which should be actually received at each time via a physical layer signal such as a PDCCH. Instead, in resources used to transmit a specific discovery signal checked via higher layer signaling, the UE attempts to detect the discovery signal unless a problem occurs in other operations. If the discovery signal is detected, detection of the discovery signal and the configuration such as receive power of the detected signal are reported to the eNB. In particular, the eNB may inform the UE that the specific discovery signal may be transmitted using arbitrary resources and the UE may attempt to detect the discovery signal at detectable subframes.

The UE may not attempt to detect the discovery signal at resources on which a specific discovery signal may be transmitted, if discovery signal detection causes a problem in other operations. When the UE performs uplink transmission to the eNB at the same time, discovery signal detection may cause a problem in other operations.

Figure 13:
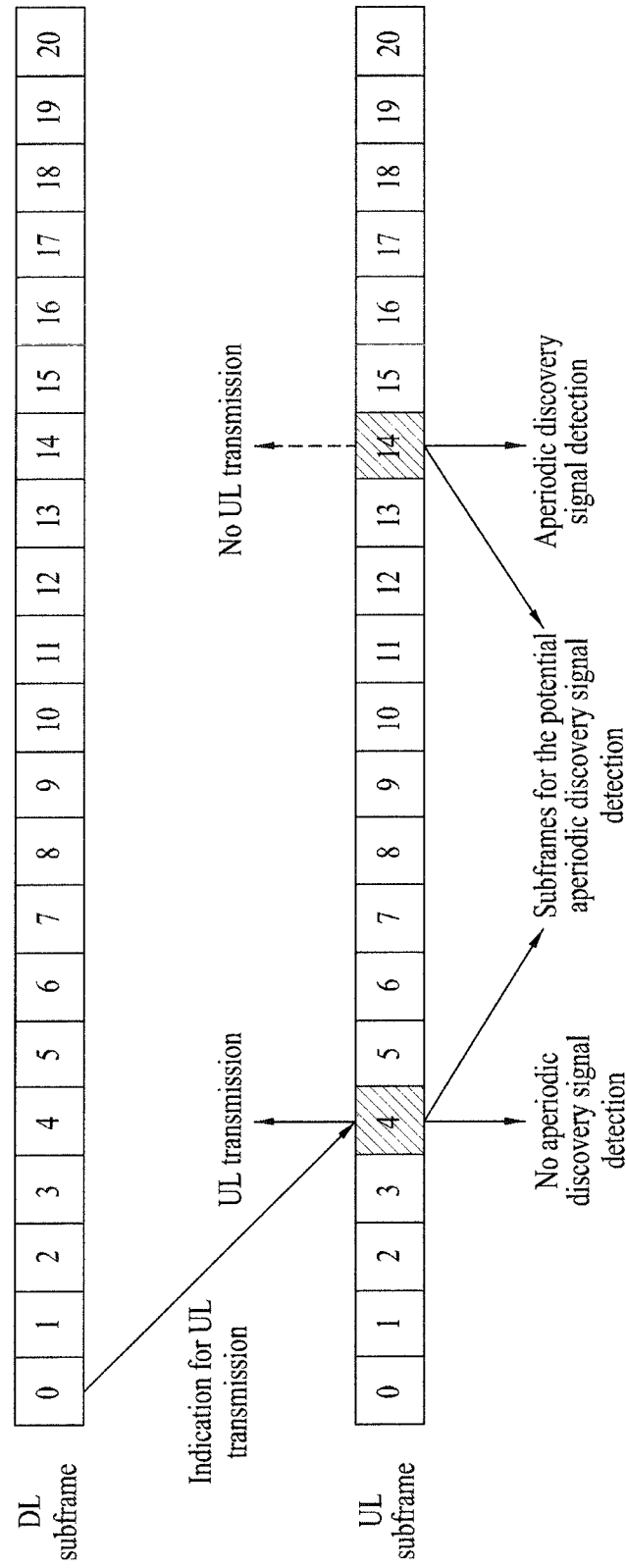
FIG. 13 is a diagram showing a method for solving a problem that discovery signal detection has influence on uplink transmission to an eNB according to an embodiment of the present invention.

FIG. 13 is a diagram showing a method for solving a problem that discovery signal detection has influence on uplink transmission to an eNB according to an embodiment of the present invention.

Referring to FIG. 13, assume that the eNB informs the UE that a specific aperiodic discovery signal may be transmitted on uplink subframe #4 and subframe #14 via higher layer signaling. At this time, since the eNB indicates, on downlink subframe #0, uplink transmission on uplink subframe #4 and the UE performs uplink transmission on uplink subframe #4, aperiodic discovery signal reception operation may be omitted. Here, uplink transmission indicated by the eNB may be transmission of a HARQ-ACK for a PDSCH, transmission of a PUSCH or transmission of an aperiodic SRS. In contrast, since the UE does not receive indication for uplink transmission on uplink subframe #14, aperiodic discovery signal detection may be attempted.

The UE may selectively attempt detection with respect to resources, on which the discovery signal is transmitted, only when discovery signal detection operation can be performed to omit physical layer signal transmission of the eNB indicating reception of the aperiodic discovery signal, thereby reducing signaling overhead. In particular, such operation is advantageous in that individual transmission of a physical layer signal to a reception UE is unnecessary when a plurality of UEs receives a single discovery signal.

In addition, subframes, on which the discovery signals are not detected by the UE, may include subframes on which uplink transmission by direct dynamic indication via a physical layer signal of the eNB, semi-static uplink transmission, e.g., periodic SRS transmission or semi persistent scheduling (SPS) transmission, RACH transmission or SR transmission is performed.

As another example in which the reception UE does not attempt to detect the discovery signal in resources, on which a specific discovery signal may be transmitted, in direct communication between UEs, detection operation of the discovery signal may cause a problem in UE transmission operation at the subframe located ahead of or behind the subframe on which the discovery signal may be transmitted.

More specifically, if a discovery signal uses a last symbol of a specific subframe and the UE should perform transmission operation of a signal such as a PUCCH or a PUSCH on a first symbol of a next subframe, a time required for the reception UE to switch reception operation to transmission operation in the same frequency band may not be ensured.

Figure 14:
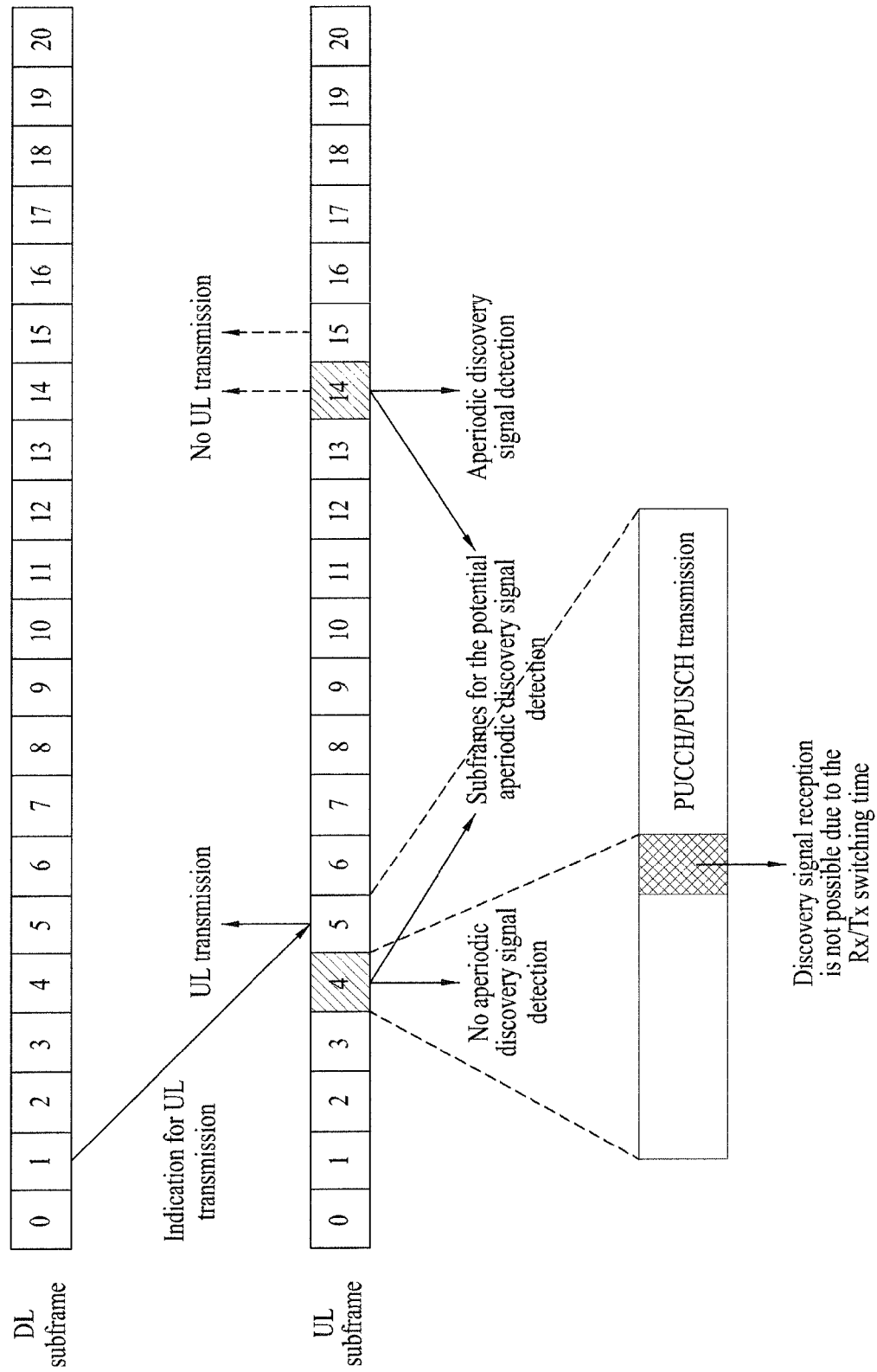
FIG. 14 is a diagram showing operation for detecting a discovery signal according to an embodiment of the present invention.

FIG. 14 is a diagram showing operation for detecting a discovery signal according to an embodiment of the present invention.

Referring to FIG. 14, for transmission operation at uplink subframe #5 indicated at downlink subframe #1, the UE may omit discovery signal detection at uplink subframe #4. Since uplink transmission is not performed at uplink subframe #14 and uplink subframe #15, reception of the discovery signal may be performed at uplink subframe #14.

If the UE switches between transmission operation and reception operations at a very high speed, such restriction is unnecessary. Thus, the UE may report information about a time required for the UE to switch between transmission and reception (or information about whether transmission and reception switching between adjacent subframes has influence on transmission operation at a first symbol of the subframe) to the eNB in advance and the eNB may schedule uplink transmission of the UE and aperiodic discovery signal detection operation based on this information.

Influence of uplink transmission at subframe #n or subframe #(n+1) on discovery signal reception at subframe #n may be limited to uplink transmission directly indicated by the eNB via a physical layer signal such as a PDCCH or an EPDCCH. In particular, if reception of the discovery signal is indicated via the physical layer signal, semi-static signal transmission, such as uplink SPS mode or periodic CSI report, or transmission autonomously performed by the UE, such as SR transmission, may be omitted and reception of the discovery signal at the previous or same subframe may be preferentially performed.

As another example in which the reception UE does not attempt to detect the discovery signal at resources on which a specific discovery signal may be transmitted in direct communication between UEs, the UE may use a circuit for performing reception operation of the discovery signal at the resources, for another use. This will be described with reference to the drawings.

Figure 15:
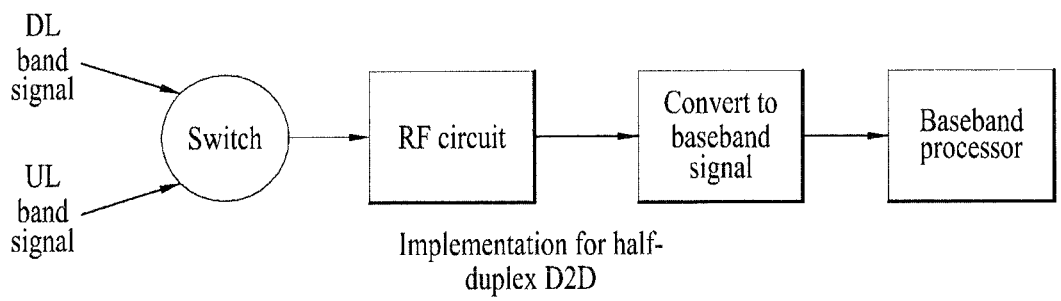
FIG. 15 is a diagram showing the configuration of a UE for performing half-duplex D2D communication.

FIG. 15 is a diagram showing the configuration of a UE for performing half-duplex D2D communication. In particular, FIG. 15 shows a structure for alternately performing reception of a downlink signal and reception of a D2D signal using one reception circuit.

Referring to FIG. 15, if the UE receives a downlink band signal at a specific time, a discovery signal transmitted in an uplink band may not be detected at that time. Accordingly, even in this case, the UE checks a location where the eNB transmits the downlink band signal and assigns higher priority to eNB signal reception if the downlink band signal of the eNB should be received even in a time region in which the discovery signal may be transmitted, thereby omitting discovery signal detection at that time.

If the UE, which performs half-duplex D2D communication, should receive a PDSCH or an EPDCCH using all OFDM symbols of a certain subframe, discovery signal detection is impossible at that subframe. In contrast, if only a PDCCH using some OFDM symbols located at a front portion of the subframe is received at a specific subframe, reception of a discovery signal transmitted at symbols located at a rear portion of the specific subframe may be possible. Accordingly, in the UE which performs half-duplex D2D communication, the downlink band signal which imposes restriction on reception of the discovery signal may be determined according to the number of OFDM symbols occupied by the signal.

Figure 16:
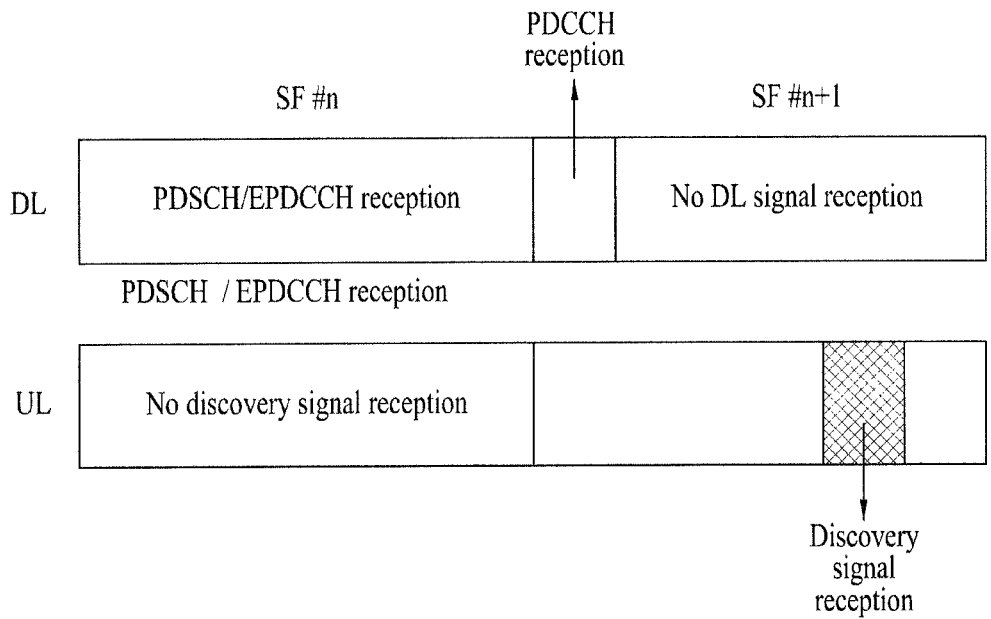
FIG. 16 is a diagram showing an example of determining whether a discovery signal is detected based on the number of OFDM symbols occupied by a downlink signal according to an embodiment of the present invention.

FIG. 16 is a diagram showing an example of determining whether a discovery signal is detected based on the number of OFDM symbols occupied by a downlink signal according to an embodiment of the present invention.

Referring to FIG. 16, assume that a discovery signal is transmitted using some symbols located at a rear portion of a subframe and, as a result, discovery signal detection is impossible if a PDSCH or an EPDCCH is received at subframe #n but detection is possible if only a PDCCH is received at subframe #(n+1). Here, the EPDCCH is a new type of control channel defined in the 3GPP standard and is transmitted via a data region of a subframe or a PDSCH region.

In addition, at subframe #(n+1) of FIG. 16, some time durations located ahead of and behind a discovery signal reception region may be used as a region for transmission and reception mode switching in each band by the UE and compensation of timing advance (TA) applied to an uplink subframe.

As a method of, at a UE, determining whether a discovery signal is detected according to operation thereof or an additional method, the eNB may indicate reception of a specific discovery signal with respect to a series of UEs via a specific PDCCH or EPDCCH. For example, the eNB may inform UEs that a specific discovery signal is specified using specific DCI scrambled with an identifier such as an RNTI shared among a series of UEs and is attempted to be received. Even in this case, if discovery signal detection of the specific UE is impossible, discovery signal detection may be omitted.

In addition, the aperiodic discovery signal may be transmitted from the UE without the dynamic indication of the eNB. For example, although the UEs attempt to transmit the discovery signal according to a predetermined period, aperiodic transmission within a predetermined range may be performed instead of accurate periodic transmission, as a result of randomly setting a transmission time between UEs. In addition, the aperiodic discovery signal may not be transmitted for the purpose of determining whether a specific UE is present but may be transmitted as a reference signal for synchronization of direct communication between UEs by a series of UEs. The detailed format of the signal may follow the signal of a legacy LTE system, such as SRS, PRACH, PSS or SSS, or may use a new type of signal. The above-described principle is applicable to direct communication between UEs corresponding to direct exchange of data in addition to a discovery signal.

Figure 17:
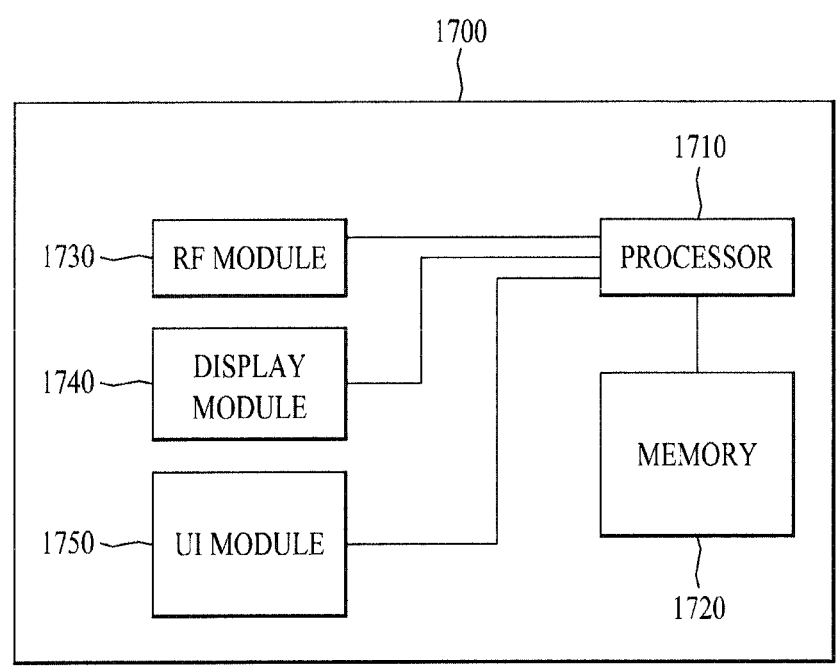
FIG. 17 is a block diagram of a communication apparatus according to an embodiment of the present invention.

FIG. 17 is a block diagram for an example of a communication device according to one embodiment of the present invention.

Referring to FIG. 17, a communication device 1700 may include a processor 1710, a memory 1720, an RF module 1730, a display module 1740, and a user interface module 1750.

Since the communication device 1700 is depicted for clarity of description, prescribed module(s) may be omitted in part. The communication device 1700 may further include necessary module(s). And, a prescribed module of the communication device 1700 may be divided into subdivided modules. A processor 1710 is configured to perform an operation according to the embodiments of the present invention illustrated with reference to drawings. In particular, the detailed operation of the processor 1710 may refer to the former contents described with reference to FIG. 1 to FIG. 16.

The memory 1720 is connected with the processor 1710 and stores an operating system, applications, program codes, data, and the like. The RF module 1730 is connected with the processor 1710 and then performs a function of converting a baseband signal to a radio signal or a function of converting a radio signal to a baseband signal. To this end, the RF module 1730 performs an analog conversion, amplification, a filtering, and a frequency up conversion, or performs processes inverse to the former processes. The display module 1740 is connected with the processor 1710 and displays various kinds of informations. And, the display module 1740 can be implemented using such a well-known component as an LCD (liquid crystal display), an LED (light emitting diode), an OLED (organic light emitting diode) display and the like, by which the present invention may be non-limited. The user interface module 1750 is connected with the processor 1710 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although an example in which a method and apparatus for detecting a UE for direct communication between UEs in a wireless communication system is applied to a 3GPP LTE system has been described, the present invention is applicable to various wireless communication systems in addition to the 3GPP LTE system.

The invention claimed is:

1. A method for, at a first user equipment (UE), receiving a discovery signal for direct communication with a second UE in a wireless communication system, the method comprising:
receiving, by the first UE, information about a plurality of configurations for the discovery signal from a base station;
receiving, by the first UE and on a first subframe, downlink control information including a field indicating a configuration, which is used for reception of the discovery signal from the second UE on a second subframe after the first subframe, among the plurality of configurations from the base station;
reporting, by the first UE, information about whether transmission at a first symbol of a next subframe of the second subframe is possible or not, in case that switching operation from reception on the second subframe to transmission on the next subframe of the second subframe is performed,
wherein the discovery signal uses a last symbol of the second subframe and there is an uplink signal to be transmitted to the base station on the first symbol of the next subframe of the second subframe;
determining, by the first UE, whether or not to detect the discovery signal on the second subframe, in consideration of uplink signals to be transmitted to the base station; and
detecting, by the first UE, the discovery signal on the second subframe, if the transmission at the first symbol of the next subframe of the second subframe is possible,
wherein the first UE avoids detecting the discovery signal on the second subframe, if the transmission at the first symbol of the next subframe of the second subframe is not possible.

2. The method according to claim 1, wherein the first UE avoids detecting the discovery signal on the second subframe, if there is an uplink signal to be transmitted to the base station on the second subframe.

3. The method according to claim 1, further comprising:
reporting a received strength of the discovery signal and information about the second subframe to the base station if the first UE detects the discovery signal on the second subframe.

4. A first user equipment (UE) apparatus for receiving a discovery signal for direct communication with a second UE apparatus in a wireless communication system, the first UE apparatus comprising:
a transceiver; and
a processor operatively connected to the transceiver and configured to:
receive information about a plurality of configurations for the discovery signal from a base station,
receive, on a first subframe, downlink control information including a field indicating a configuration, which is used for reception of the discovery signal from the second UE apparatus on a second subframe after the first subframe, among the plurality of configurations from the base station,
report information about whether transmission at a first symbol of a next subframe of the second subframe is possible or not, in case that switching operation from reception on the second subframe to transmission on the next subframe of the second subframe is performed,
wherein the discovery signal uses a last symbol of the second subframe and there is an uplink signal to be transmitted to the base station on the first symbol of the next subframe of the second subframe,
determine whether or not to detect the discovery signal on the second subframe, in consideration of uplink signals to be transmitted to the base station, and
detect the discovery signal on the second subframe, if the transmission at the first symbol of the next subframe of the second subframe is possible,
wherein the first UE apparatus avoids detecting the discovery signal on the second subframe, if the transmission at the first symbol of the next subframe of the second subframe is not possible.

5. The first UE apparatus according to claim 4, wherein the processor is further configured to avoid detecting the discovery signal on the second subframe, if there is an uplink signal to be transmitted to the base station on the second subframe.

6. The first UE apparatus according to claim 5, wherein the processor is further configured to:
   report a received strength of the discovery signal and information about the second subframe to the base station if the processor detects the discovery signal on the second subframe.

* * * * *